US011940287B2

(12) United States Patent
Hou et al.

(10) Patent No.: US 11,940,287 B2
(45) Date of Patent: Mar. 26, 2024

(54) DEVICE AND METHOD FOR ROUTE PLANNING

(71) Applicants: INTEL CORPORATION, Santa Clara, CA (US); MOBILEYE VISION TECHNOLOGIES LTD., Jerusalem (IL)

(72) Inventors: Yuqing Hou, Beijing (CN); Xiaolong Liu, Beijin (CN); Ignacio J. Alvarez, Portland, OR (US); Xiangbin Wu, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/763,230

(22) PCT Filed: Dec. 27, 2019

(86) PCT No.: PCT/CN2019/129143
§ 371 (c)(1),
(2) Date: Mar. 24, 2022

(87) PCT Pub. No.: WO2021/128264
PCT Pub. Date: Jul. 1, 2021

(65) Prior Publication Data
US 2022/0333944 A1  Oct. 20, 2022

(51) Int. Cl.
*G01C 21/34* (2006.01)
*G01C 21/36* (2006.01)

(52) U.S. Cl.
CPC ..... *G01C 21/3492* (2013.01); *G01C 21/3461* (2013.01); *G01C 21/3614* (2013.01)

(58) Field of Classification Search
CPC ............ G01C 21/3492; G01C 21/3461; G01C 21/3614
See application file for complete search history.

(56) References Cited

U.S. PATENT DOCUMENTS

| 9,261,377 | B2 * | 2/2016 | Krzanowski ........... G01C 21/34 |
| 10,209,712 | B2 | 2/2019 | Stein | |
| 11,175,150 | B2 * | 11/2021 | Mishra ............... G01C 21/3614 |
| 11,709,067 | B2 * | 7/2023 | Gray .................... G01C 21/362 |
| | | | 701/422 |

(Continued)

FOREIGN PATENT DOCUMENTS

| CN | 102393206 A | 3/2012 |
| CN | 102798394 A | 11/2012 |

(Continued)

OTHER PUBLICATIONS

English translation CN106327899B (Year: 2023).*

(Continued)

*Primary Examiner* — Rami Khatib
(74) *Attorney, Agent, or Firm* — Viering, Jentschura & Partner mbB

(57) ABSTRACT

Provided is a device and a method for route planning. The route planning device (100) may include a data interface (128) coupled to a road and traffic data source (160); a user interface (170) configured to display a map and receive a route planning request from a user, the route planning request including a line of interest on the map; a processor (110) coupled to the data interface (128) and the user interface (170). The processor (110) may be configured to identify the line of interest in response to the route planning request; acquire, via the data interface (128), road and traffic information associated with the line of interest from the road and traffic data source (160); and calculate, based on the acquired road and traffic information, a navigation route that matches or corresponds to the line of interest and meets or satisfies predefined road and traffic constraints.

17 Claims, 9 Drawing Sheets

(56) References Cited

U.S. PATENT DOCUMENTS

| | | | |
|---|---|---|---|
| 2011/0301830 A1* | 12/2011 | Tate, Jr. | G01C 21/3461 |
| | | | 701/420 |
| 2012/0029821 A1* | 2/2012 | Nesbitt | G01C 21/3673 |
| | | | 701/527 |
| 2013/0290909 A1* | 10/2013 | Gray | G01C 21/3492 |
| | | | 715/854 |
| 2014/0058652 A1 | 2/2014 | Duan et al. | |
| 2014/0229101 A1* | 8/2014 | Glaser | G01C 21/34 |
| | | | 701/538 |
| 2015/0051835 A1* | 2/2015 | Jung | G01C 21/3614 |
| | | | 701/533 |
| 2015/0285649 A1 | 10/2015 | Zhang et al. | |
| 2015/0323339 A1* | 11/2015 | Yamaguchi | G01C 21/3605 |
| | | | 701/533 |
| 2018/0164827 A1* | 6/2018 | Chu | G05D 1/0217 |
| 2018/0188063 A1* | 7/2018 | Thommen | G01C 21/3664 |
| 2021/0215490 A1* | 7/2021 | Mishra | G01C 21/3415 |

FOREIGN PATENT DOCUMENTS

| | | | | |
|---|---|---|---|---|
| CN | 103884341 A | | 6/2014 | |
| CN | 104677369 A | | 6/2015 | |
| CN | 105526943 A | | 4/2016 | |
| CN | 106327899 A | | 1/2017 | |
| CN | 106327899 B | * | 8/2019 | ....... G08G 1/096811 |

OTHER PUBLICATIONS

Shalev-Shwartz, Shai et al., "On a Formal Model of Safe and Scalable Self-driving Cars", Oct. 27, 2018, arXiv:1708.06374v6, retrieved from https://arxiv.org/abs/1708.06374 on Mar. 22, 2023, 37 pages.

T. Sekimoto, et al., "An Imprementation of a Human Interface using a Touch Panel and Visual Images for Controlling a Vehicle", Proceedings 5th IEEE International Workshop on Robot and Human Communication. RO-MAN'96 Tsukuba, 1996, 6 pages.

Ros, F., et al., "Scribble your way through traffic", Adjunct Proceedings of the 10th International Conference on Automotive User Interfaces and Interactive Vehicular Applications, https://dl.acm.org/doi/10.1145/3239092.3267849, retrieved on Mar. 22, 2022, 5 pages.

"Google Maps Route Planning", Youtube, https://www.youtube.com/watch?v=MJumhCPTdUE, retrieved on Mar. 3, 2022, 10 pages.

"Use navigation in the Google Maps app", Google, https://support.google.com/maps/answer/3273406?co=GENIE.Platform%3DiOS &hl=en, retrieved on Mar. 3, 2022, 2 pages.

International Search Report issued for the corresponding PCT patent application No. PCT/CN2019/129143, dated Sep. 30, 2022, 5 pages (For informational purposes only).

Supplementary European search report issued for the corresponding European patent application No. 19957943, dated Sep. 8, 2023, 1 page (for informational purposes only).

* cited by examiner

The 2 Bridges are Under Maintenance

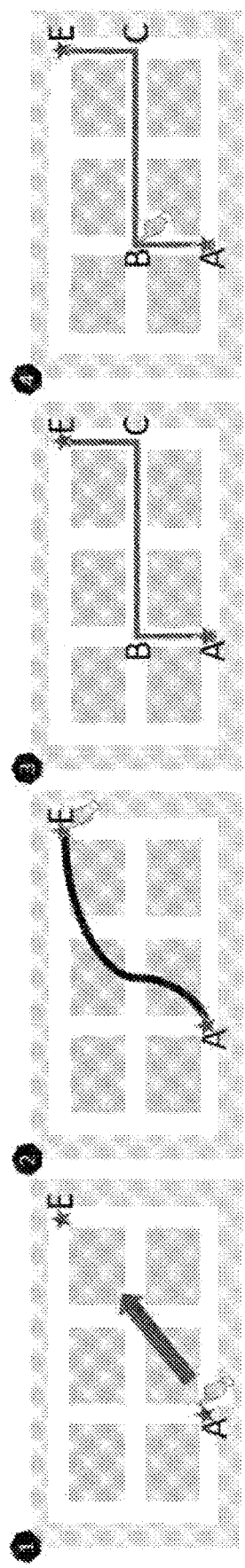
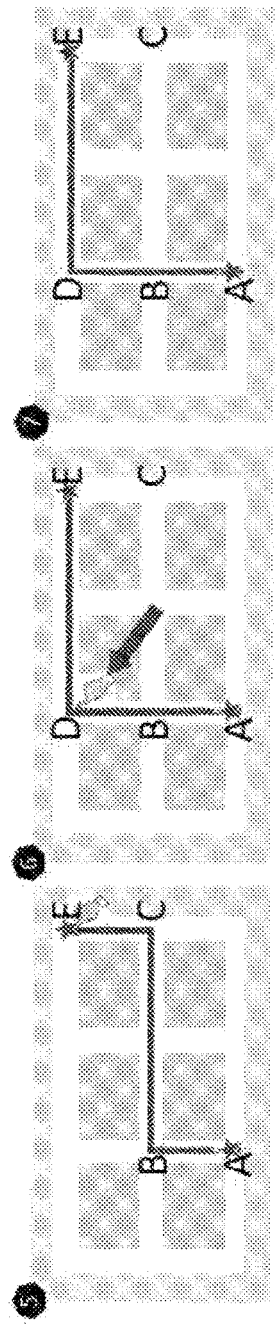
FIG. 6A  FIG. 6B  FIG. 6C  FIG. 6D
FIG. 6E  FIG. 6F  FIG. 6G

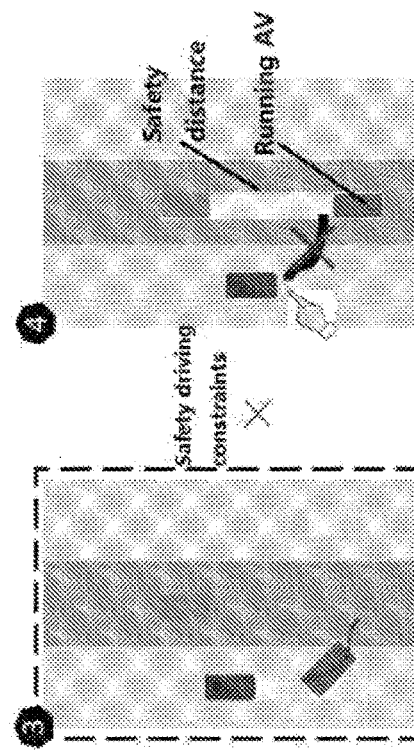
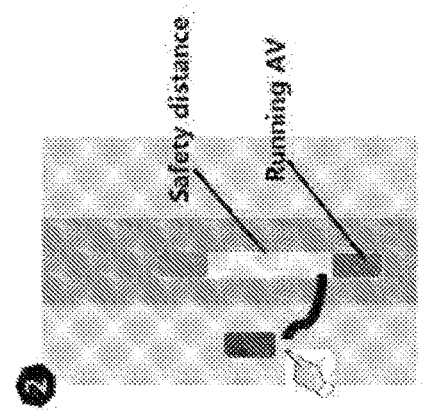
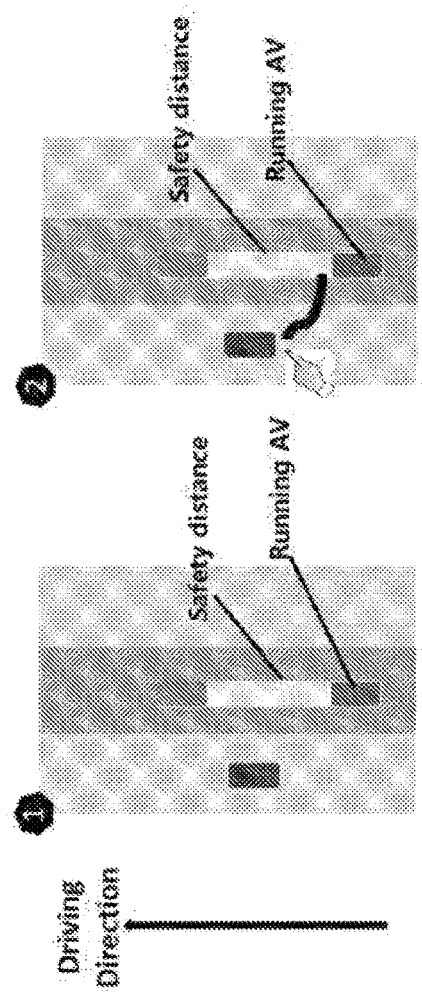
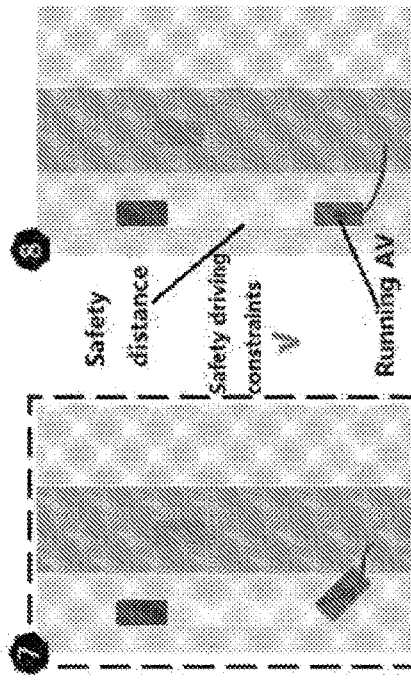
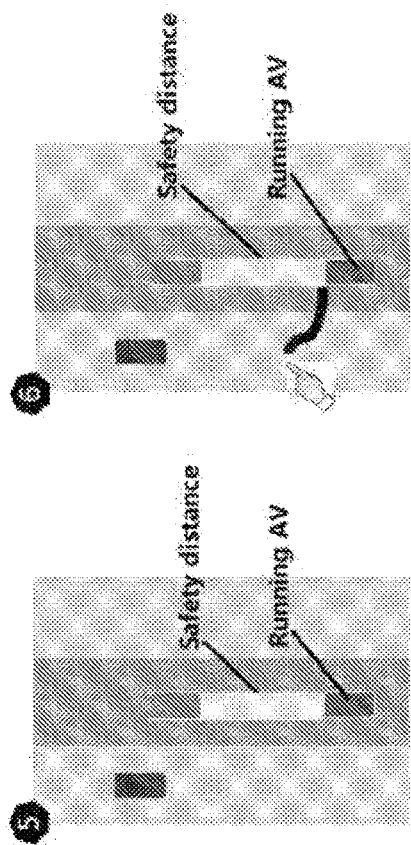

DEVICE AND METHOD FOR ROUTE PLANNING

CROSS-REFERENCE TO RELATED APPLICATIONS

This application is a national phase under 35 USC 371 of PCT Application PCT/CN2019/129143, filed on Dec. 27, 2019, the entire contents of which are fully incorporated herein by reference.

TECHNICAL FIELD

Embodiments of the present disclosure generally relate to the field of navigation, and in particular to a device and a method for route planning.

BACKGROUND ART

In the field of navigation, a route planning process is usually done by a navigation device considering road and traffic conditions to search for a shortest route or a fastest route between a departure point and a destination point preset by a user. The user may enter at least a destination address to get a route to the destination address automatically calculated by the navigation device. What's more, on a touch screen installed in the navigation device, the user may enter the destination address or modify the route by touching on a point of interest (POI) or a series of points of interests (POIs). Then the navigation device may automatically calculate a plausible route based on the POI or the series of POIs.

SUMMARY

In an aspect, a route planning device is provided in the disclosure. The route planning device includes a data interface coupled to a road and traffic data source; a user interface configured to display a map and receive a route planning request from a user, the route planning request including a line of interest on the map; a processor coupled to the data interface and the user interface, and configured to: identify the line of interest in response to the route planning request; acquire, via the data interface, road and traffic information associated with the line of interest from the road and traffic data source; and calculate, based on the acquired road and traffic information, a navigation route that matches or corresponds to the line of interest and meets or satisfies predefined road and traffic constraints.

In another aspect, an autonomous vehicle is provided in the disclosure. The autonomous vehicle includes a control system, one or more image capture devices, one or more sensors and the above route planning device, wherein the navigation route planned by the route planning device is provided to the control system in response to the route planning request.

In another aspect, a route planning method is provided in the disclosure. The route planning method includes receiving a route planning request from a user, the route planning request including a line of interest on a map; identifying the line of interest in response to the route planning request; acquiring road and traffic information associated with the line of interest from a road and traffic data source; and calculating, based on the acquired road and traffic information, a navigation route that matches or corresponds to the line of interest and meets or satisfies predefined road and traffic constraints.

In another aspect, a route planning processor configured to perform the above route planning method is provided in the disclosure.

In yet another aspect, a user interface for navigation is provided. The user interface is configured to display a map, receive a route planning request from a user and display a navigation route on the map in response to the route planning request, wherein the route planning request includes a line of interest on the map, and the navigation route matches or corresponds to the line of interest and meets or satisfies predefined road and traffic constraints.

BRIEF DESCRIPTION OF THE DRAWINGS

Embodiments of the disclosure will be illustrated, by way of example and not limitation, in the figures of the accompanying drawings in which like reference numerals refer to similar elements.

FIG. 6A to FIG. 6G schematically illustrate an exemplary global offline route planning process according to various embodiments of the disclosure.

FIG. 8A to FIG. 8H schematically illustrate an exemplary local online route planning process according to various embodiments of the disclosure.

DETAILED DESCRIPTION OF EMBODIMENTS

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

System Overview

Figure 1:
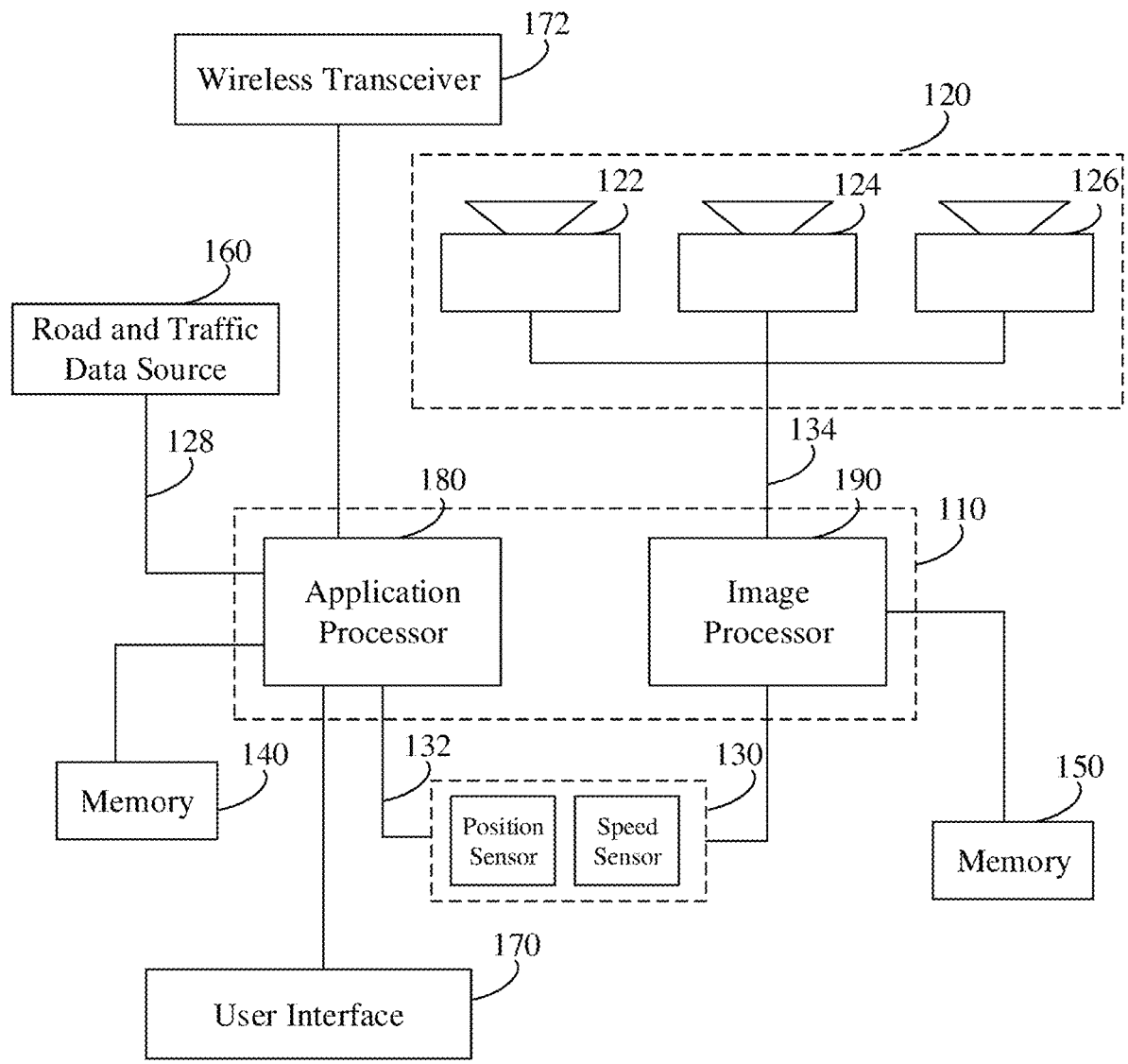
FIG. 1 is a block diagram representation of an exemplary system according to various embodiments of the disclosure.

FIG. 1 is a block diagram representation of an exemplary system according to various embodiments of the disclosure. System 100 may include various components depending on the requirements of a particular implementation. In some embodiments, the system 100 may include a processing unit 110, an image acquisition unit 120, a sensor unit 130, one or more memory units 140, 150, a road and traffic data source 160, a user interface 170, and a wireless transceiver 172. The processing unit 110 may include one or more processing devices. In some embodiments, the processing unit 110 may include an application processor 180, an image processor 190, or any other suitable processing device. Similarly, the image acquisition unit 120 may include any number of image acquisition devices and components depending on the requirements of a particular application. In some embodiments, the image acquisition unit 120 may include one or more image capture devices (e.g., cameras), such as an image capture device 122, an image capture device 124, and an image capture device 126. The system 100 may also include a first data interface 128 communicatively connecting the processing unit 110 to the road and traffic data source 160. For example, the data interface 128 may include any wired and/or wireless link or links for transmitting road and traffic information from the road and traffic data source 160 to the processing unit 110. In addition, the system 100 may also include other data interfaces, such as a data interface 132 communicatively connecting the processing unit 110 to the sensor unit 130, a data interface 134 communicatively connecting the processing unit 110 to the image acquisition unit 120, and the like.

A wireless transceiver 172 may include one or more devices configured to exchange transmissions over an air interface to one or more networks (e.g., cellular, the Internet, etc.) by use of a radio frequency, infrared frequency, magnetic field, or an electric field. The wireless transceiver 172 may use any known standard to transmit and/or receive data (e.g., Wi-Fi, Bluetooth®, Bluetooth Smart, 802.15.4, Zig-Bee, etc.).

Both the application processor 180 and the image processor 190 may include various types of processing devices. For example, either or both of the application processor 180 and the image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, the application processor 180 and/or the image processor 190 may include any type of single or multi-core processor, mobile device microcontroller, central processing unit, etc. Various processing devices may be used, and may include various architectures.

In some embodiments, the application processor 180 and/or the image processor 190 may include some types of processor designs. These processor designs each include multiple processing units with local memory and instruction sets. Such processors may include video inputs for receiving image data from multiple image sensors and may also include video output capabilities. In one example, the processor uses 90 nm-micron technology operating at 332 Mhz. The processor architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications.

Any of the processing devices disclosed herein may be configured to perform certain functions. Configuring a processing device, such as any of the described processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of the application processor 180 and the image processor 190. In other embodiments, these tasks may be performed by more than two processing devices. Further, in some embodiments, the system 100 may include one or more processing units 110 without including other components, such as the image acquisition unit 120.

The processing unit 110 may comprise various types of devices. For example, the processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., the application processor 180 and/or the image processor 190), may control operations of various aspects of the system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the application processor 180 and/or the image processor 190. In other embodiments, these memory units may be integrated into the application processor 180 and/or the image processor 190.

The sensor unit 130 may include various types of sensors, such as a position sensor, a speed sensor, and the like. The position sensor may include any type of device suitable for determining a location associated with at least one component of the system 100. In some embodiments, the position sensor may include a GPS receiver. Such receivers can determine a user position and velocity by processing signals broadcasted by global positioning system satellites. Position information from the position sensor may be made available to the application processor 180 and/or the image processor 190. In addition, the sensor unit 130 may include components such as the speed sensor (e.g., a tachometer) for measuring a speed of a vehicle and/or an accelerometer (not shown) for measuring an acceleration of the vehicle.

User interface 170 may include any device suitable for providing information to or for receiving inputs from one or more users of the system 100. In some embodiments, the user interface 170 may include user input devices, including, for example, a touchscreen, microphone, keyboard, pointer devices, track wheels, cameras, knobs, buttons, etc. With such input devices, a user may be able to provide information inputs or commands to the system 100 by typing instructions or information, providing voice commands, selecting menu options on a screen using buttons, pointers, or eye-tracking capabilities, or through any other suitable techniques for communicating information to the system 100.

User interface 170 may be equipped with one or more processing devices configured to provide and receive information to or from a user and process that information for use by, for example, the application processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, the user interface 170 may include a display, a speaker, a tactile device, and/or any other devices for providing output information to a user.

Road and traffic data source 160 may include any type of database for storing road and traffic information useful to the system 100. The road and traffic information may include a road layout on a map and indications about a road segment under repair, a road segment within which an activity is going on, a road segment with bad road conditions, a road segment having heavy traffic, and the like. In some embodiments, the road and traffic data source 160 may include data relating to the position, in a reference coordinate system, of various items, including roads, water features, geographic features, businesses, points of interest, restaurants, gas stations, etc. The road and traffic data source 160 may store not only the locations of such items, but also descriptors relating to those items, including, for example, names associated with any of the stored features. In some embodiments, the road and traffic data source 160 may be physically located with other components of the system 100. Alternatively or additionally, the road and traffic data source 160 or a portion thereof may be located remotely with respect to other components of the system 100 (e.g., the processing unit 110). In such embodiments, information from the road and traffic data source 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices.

Figure 2:
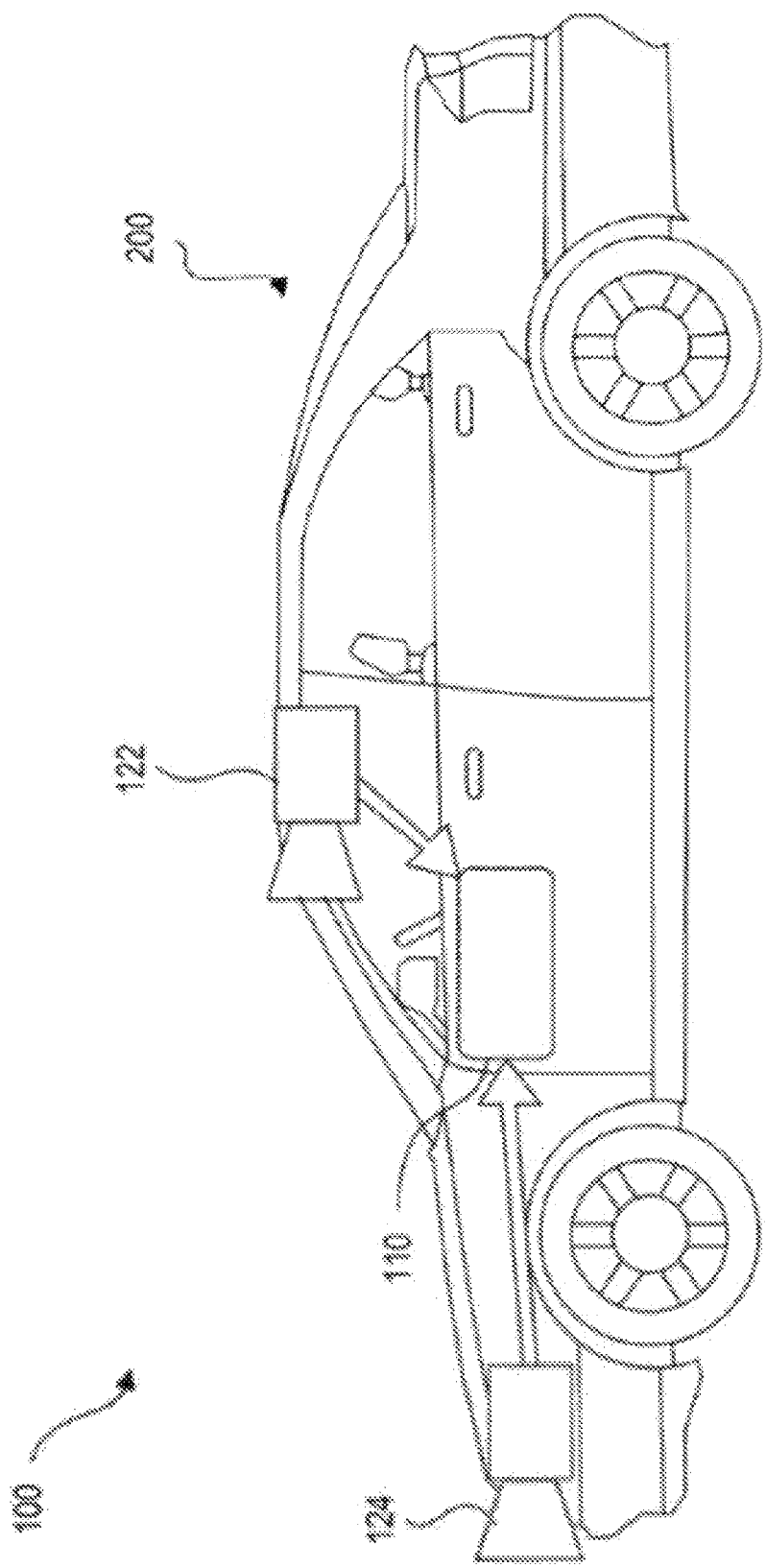
FIG. 2 is a diagrammatic side view representation of an exemplary vehicle including a system according to various embodiments of the disclosure.

The system 100, or various components thereof, may be incorporated into various different platforms. In some embodiments, the system 100 may be included on a vehicle 200 (e.g. an autonomous vehicle), as shown in FIG. 2. For example, the vehicle 200 may be equipped with the processing unit 110 and any of the other components of the system 100, as described above relative to FIG. 1. While in some embodiments vehicle 200 may be equipped with only a single image capture device (e.g., camera), in other embodiments, multiple image capture devices may be used. For example, any of the image capture devices 122 and 124 of the vehicle 200, as shown in FIG. 2, may be part of an ADAS (Advanced Driver Assistance Systems) imaging set.

The image capture devices included on the vehicle 200 as part of the image acquisition unit 120 may be positioned at any suitable location. In some embodiments, as shown in FIG. 2, the image capture device 122 may be located in the vicinity of the rearview mirror. This position may provide a line of sight similar to that of the driver of the vehicle 200, which may aid in determining what is and is not visible to the driver. The image capture device 122 may be positioned at any location near the rearview mirror, but placing the image capture device 122 on the driver side of the mirror may further aid in obtaining images representative of the driver's field of view and/or line of sight.

Other locations for the image capture devices of the image acquisition unit 120 may also be used. For example, the image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of the vehicle 200, on the roof of the vehicle 200, on the hood of the vehicle 200, on the trunk of the vehicle 200, on the sides of the vehicle 200, mounted on, positioned behind, or positioned in front of any of the windows of the vehicle 200, and mounted in or near light fixtures on the front and/or back of the vehicle 200, etc.

In addition to image capture devices, the vehicle 200 may include various other components of system 100. For example, the processing unit 110 may be included on the vehicle 200 either integrated with or separate from an engine control unit (ECU) of the vehicle. The vehicle 200 may also be equipped with the sensor unit 130 including a position sensor, a speed sensor and/or any other sensor useful to the vehicle 200, and may also include the road and traffic data source 160 and the memory units 140 and 150.

As discussed earlier, the wireless transceiver 172 may transmit and/or receive data over one or more networks (e.g., cellular networks, the Internet, etc.). For example, the wireless transceiver 172 may upload data collected by the system

100 to one or more servers, and download data from the one or more servers. Via the wireless transceiver 172, the system 100 may receive, for example, periodic or on-demand or real-time updates to data stored in the road and traffic data source 160, the memory 140, and/or the memory 150. Similarly, the wireless transceiver 172 may upload any data (e.g., images captured by image acquisition unit 120, data received by one or more sensors in the sensor unit 130, vehicle control systems, etc.) from the system 100 and/or any data processed by processing unit 110 to the one or more servers.

In addition, for more details about the components of the system 100 and their possible implementations in the vehicle 200, references may be made to a U.S. patent Ser. No. 10/209,712 B2 issued on Feb. 19, 2019 and titled "PREDICTING AND RESPONDING TO CUT IN VEHICLES AND ALTRUISTIC RESPONSES", which is incorporated herein by reference in its entirety.

According to some embodiments of the disclosure, the system 100 may be included on an autonomous vehicle (AV) and the route planning device and method as proposed may be used on the AV. One of the biggest threats to the successful realization of the autonomous driving industry is the lack of agreement on what it means for an AV to drive safely. Thus a safety driving model may be desired in the industry of autonomous driving to provide safety assurance guidelines for the design of the AV and related products. With human-defined common sense principles for what it means to drive safely as the guide, a safety driving model is proposed. For better understanding the embodiments of the present application, the overview of an autonomous vehicle and the safety driving model will be discussed below. Meanwhile, it should be noted that the safety driving model will be only taken as an example of the safety driving model to explain the principles of the embodiments of the present application, but various types of safety driving models currently available or to be developed in the future may be applied to implement various embodiments of the present application.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle needs not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model.

The Safety Driving Model Overview

With human-defined common sense principles for what it means to drive safely as the guide, a white-box, interpretable, mathematical model for safety assurance is proposed. The safety driving model is a rigorous mathematical model formalizing an interpretation of the Duty of Care law. The Duty of Care law states that an individual should exercise "reasonable care" while performing acts that could harm others. What is meant in "being careful" is open for interpretation and must follow societal norms whose definitions are fluid, change over time, and gradually get clarified through legal precedents over past accidents that went through court proceedings for a resolution. A human driver must exercise care due to the uncertainty regarding the actions of other road users. If the drive must take into account the extreme worst case about the actions of other road users, then driving becomes impossible. Hence, the human driver makes some "reasonable" assumptions about the worst case scenarios of other road-users. The assumptions being made are referred to as an "interpretation" of the Duty of Care law.

The safety driving model is designed to achieve three goals. First, the interpretation of the Duty of Care law should be sound in the sense that it complies with how humans interpret the law. It is assumed that if all agents follow the safety driving model interpretation, then there will be zero accidents. Second, the interpretation should lead to a useful driving policy, meaning it will lead to an agile driving policy rather than an overly-defensive driving which inevitably would confuse other human drivers and will block traffic and in turn limit the scalability of system deployment. As an example of a valid, but not useful, interpretation is to assume that in order to be "careful", a road user's actions should not affect other road users. It means that if the road user wants to change lane, the road user should find a gap large enough, such that if other road users continue their own motion uninterrupted, the road user could still squeeze in without a collision. Third, the interpretation should be efficiently verifiable in the sense that it can be rigorously proved that the autonomous vehicle implements the interpretation of the law correctly. The last property is not obvious at all because there could be many interpretations which are not analytically verifiable because of "butterfly effects" where a seemingly innocent action could lead to an accident of the agent's fault in the longer future. One way to ensure efficient verification is to design the interpretation to follow the inductive principle, which is a feature designed into the safety driving model.

In general, the safety driving model is constructed by formalizing the following five safety rules:
1. Do not hit someone from behind.
2. Do not cut-in recklessly.
3. Right-of-way is given, not taken.
4. Be careful of areas with limited visibility.
5. If you can avoid an accident without causing another one, you must do it.

Following the five safety rules, the safety driving model consists of an extensive set of mathematical formulas based on a comprehensive set of driving scenarios. About the safety driving model, more details, for example, the related mathematical formulas, are explained in a paper titled "On a Formal Model of Safe and Scalable Self-driving Cars" by Shai Shalev-Shwartz, Shaked Shammah, Amnon Shashua, submitted on Aug. 21, 2017 and last revised on Oct. 27, 2018, which is incorporated herein by reference in its entirety.

Based on the safety driving model, if a navigation route of an autonomous vehicle meets constraints defined by the safety driving model, it is assumed that the autonomous vehicle can safely drive following the navigation route and will not cause a crash. Otherwise, if a navigation route may violate the constraints, the navigation route should be avoided to ensure driving safety. Therefore, when performing the route planning for a running autonomous vehicle, the constraints can be taken into account to determine a safe and plausible navigation route for the autonomous vehicle.

More generally, depending on the safety driving model to be used on the running autonomous vehicle, corresponding safety driving constraints should be satisfied when performing the route planning on the running autonomous vehicle.

In the field of navigation, a route planning process is usually done by a navigation device considering road and traffic conditions to search for a shortest route or a fastest route between a departure point and a destination point preset by a user. For example, a Google map route planning application programming interface (API) allows a user to set a departure point and a destination point on a map, and automatically generates a shortest route or a fastest route between the departure point and the destination point. Furthermore, on a touch screen, the Google map route planning API allows the user to zoom in or zoom out the map and modify the generated route by touching on the map. The user can indicate the destination point or modify the route by touching on a point of interest (POI). Then the Google map route planning API may calculate a shortest or fastest plausible route between the departure point and the destination point. The user can also define a custom route by touching on a series of points of interests (POIs) on the map. In this case, the Google map route planning API may calculate a shortest or fastest plausible route based on the series of POIs, e.g. by calculating a series of shortest or fastest plausible sub-routes between each pair of adjacent two POIs.

Figure 3:
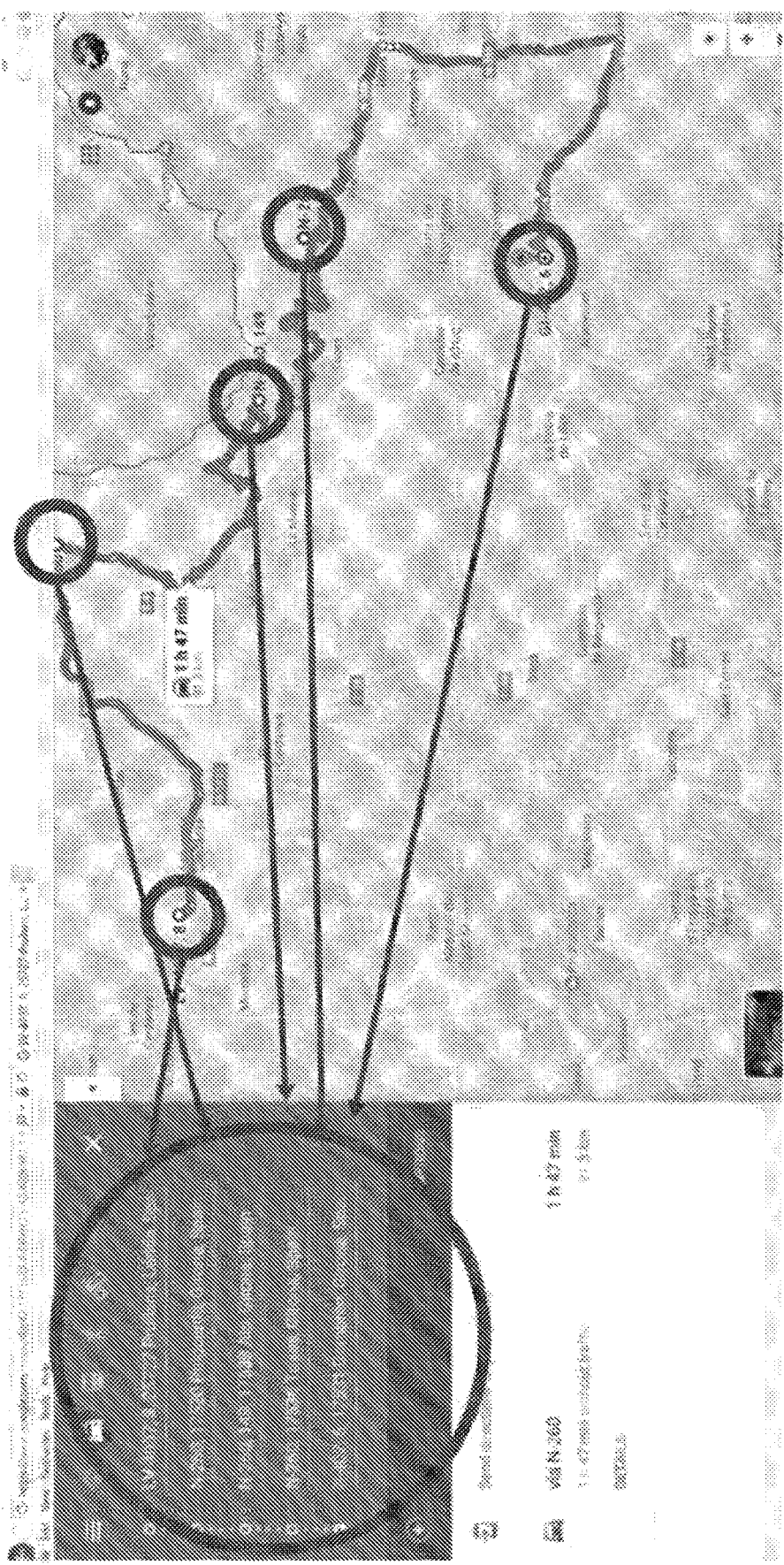
FIG. 3 schematically illustrates a route planning process based on POIs on a Google map route planning API.

FIG. 3 schematically illustrates a route planning process based on POIs on the Google map route planning API. As shown in FIG. 3, a user indicates five POIs on the map by touching. The five POIs may include a departure point, a destination point and three intermediate points of interest. In response to the user's touching on the five POIs, the Google map route planning API will automatically calculate a shortest or fastest plausible route passing through the five POIs and display the calculated route for navigation. With such a route planning process, although the user can define a custom route to some extent, the user needs to touch on the map for multi-times and the navigation is still done by searching for a shortest or fastest route based on points of interest.

In order to make the navigation more customized and user-friendly, a route planning process based on a line of interest (LOI) may be desirable. For example, when planning a trip, a user may not care about a shortest route, but rather want to see all the sights of interest on the trip as much as possible. In this case, if using the route planning process as illustrated in FIG. 3, in order to plan a trip route including all the sights of interest, the user may have to indicate all the sights by entering the addresses of these sights or touching each of these sights on the map. However, if a LOI based route planning process is available, the user may only need to draw a desired trip line on the map and then the LOI based route planning process can automatically determine a navigation route best matching the drawn trip line under certain road and traffic constraints. In this way, the user can easily visit all the sights of interest on the trip by following the determined navigation route.

In view of the above observations, a LOI based route planning process is proposed according to embodiments of the present application. Rather than one or more points of interest, the LOI based route planning process may determine a navigation route based on a line of interest. It means that rather than searching for a shortest or fastest route associated with one or more points of interest, the LOI based route planning process is to search for a navigation route best matching a line of interest drawn by a user under certain road and traffic constraints. More particularly, the LOI route planning process is performed by considering every point on the line of interest and calculating a navigation route most similar to the line of interest under predefined road and traffic constraints.

Figure 4A:
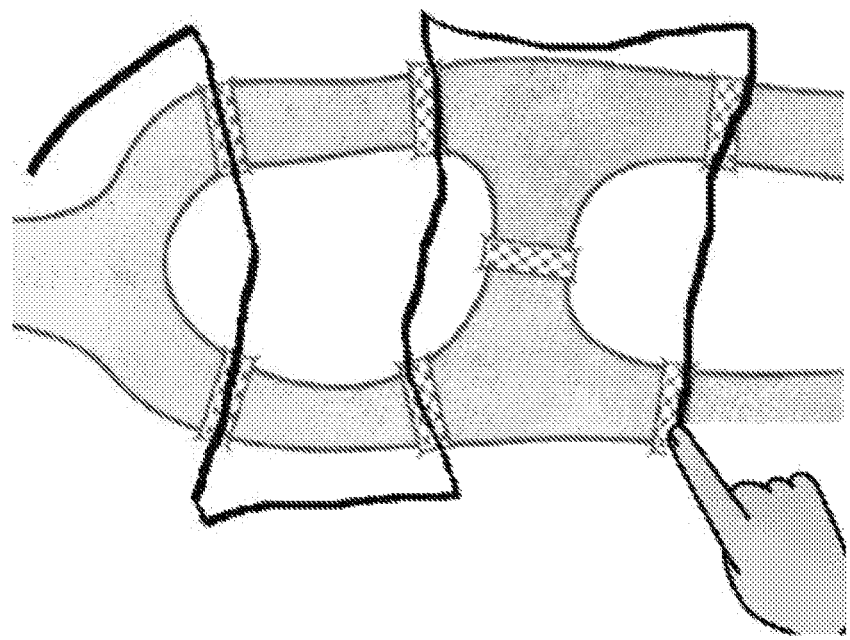
FIG. 4A and FIG. 4B schematically illustrate an example scenario of route planning according to various embodiments of the disclosure.
Figure 4B:
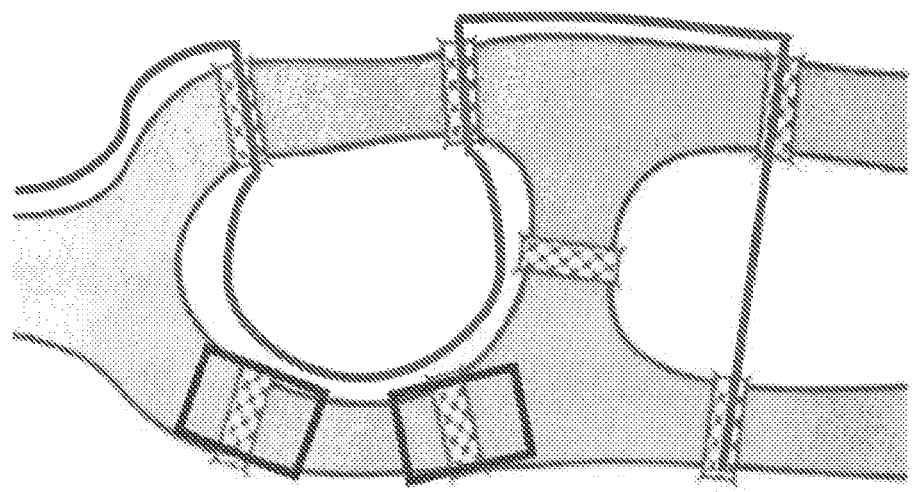

FIG. 4A and FIG. 4B schematically illustrate an example scenario of route planning according to various embodiments of the disclosure.

As illustrated in FIG. 4A, a user draws a travel line using a finger or an electronic pencil on a map displayed on a user interface of a route planning device. According to the LOI based route planning process, the route planning device may determine a navigation route best matching the travel line drawn by the user. Meanwhile, the route planning device may need to take current road and traffic conditions into account when determining the navigation route. For example, as illustrated in FIG. 4B, two bridges framed by a box are under maintenance, so the navigation route needs to bypass the two bridges. In other words, the navigation route should meet a predefined road constraint of avoiding bad road conditions. As a result, the route planning device may determine a navigation route that best matches the travel line drawn by the user and meanwhile meets the road constraint.

Figure 5:
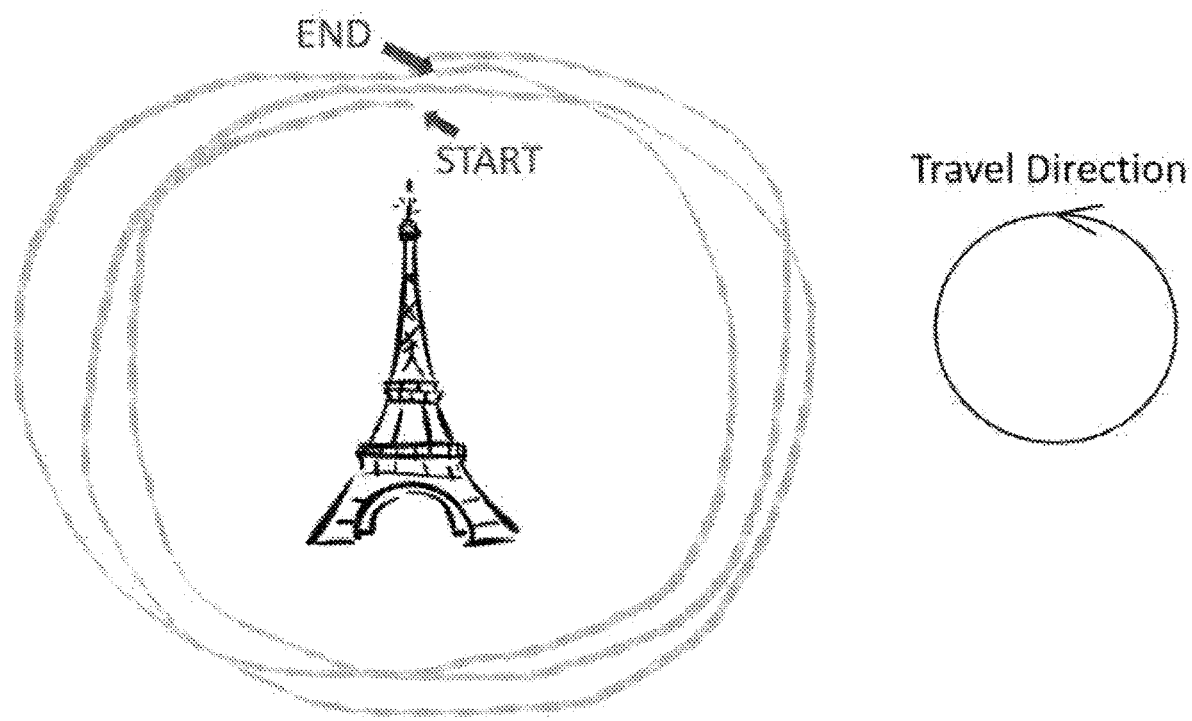
FIG. 5 schematically illustrates another example scenario of route planning according to various embodiments of the disclosure.

FIG. 5 schematically illustrates another example scenario of route planning according to various embodiments of the disclosure.

Since the LOI based route planning process takes every point on a line of interest into consideration when planning a navigation route, the LOI based route planning process may be much more efficient than the conventional POI based route planning process for planning repeat paths with overlaps.

As illustrated in FIG. 5, when a user is traveling around the Eiffel Tower, he or she may want to go around the Eiffel Tower multiple rounds. With the conventional POI based route planning process, the user should set a destination point on the map for at least two times to complete one round. For example, when the user is at the east side of the Eiffel Tower, he or she may need first set the destination point to be somewhere at the west side of the Eiffel Tower and get a navigation route to the destination point. Then when the user follows the navigation route to arrive at the destination point at the west side of the tower, he or she may have to set the destination point again to be somewhere at the east side of the tower. It means that the user may have to set the destination point twice for driving around the tower. Thus if the user wants to drive around the tower for N rounds, the user may have to set the destination points for at least 2N times.

However, according to the LOI based route planning process, the use may just draw three circles around the Eiffel Tower continuously, and the route planning device may identify the three circles as a line of interest and determine a navigation route for navigating the user to travel around the tower for three rounds. Since there is no pause when the user draws the three circles, the three circles as a whole may be identified as the line of interest and thus the navigation route may be determined as corresponding to the continuous three circles. In addition, it is noted that the three circles may overlap with each other, which will not affect the route planning.

As described by referring to the above example scenarios, the LOI based route planning process is proposed according to the embodiments of the present application. The LOI based route planning process involves identification of a line of interest and determination of a navigation route best matching the line of interest under predefined road and traffic constraints. In other words, the route planning device In addition, the route planning process may further involve interactions between the user and the route planning device to offer a more user-friendly experience.

In order to implement the proposed LOI based route planning process, the present application provides a route planning device including a data interface, a user interface and a processor coupled to the data interface and the user interface. The route planning device may be a part of the system 100 as shown in FIG. 1, and may be used separately from a vehicle or may be incorporated in the vehicle. The data interface (e.g. the data interface 128 in FIG. 1) may be coupled to a road and traffic data source, for example, the road and traffic data source 160 in FIG. 1. The user interface (e.g. the user interface 170 in FIG. 1) may be configured to display a map and receive a route planning request from a user, and the route planning request may include a line of interest drawn by the user on the map. The processor (e.g. the processing unit 110 in FIG. 1) may be configured to identify the line of interest in response to the route planning request; acquire, via the data interface, road and traffic information associated with the line of interest from the road and traffic data source; and determine, based on the acquired road and traffic information, a navigation route that best matches the line of interest and meets predefined road and traffic constraints.

In various embodiments of the present disclosure, the route planning device may be used by a user to make a long-term route plan before a trip starts. For example, suppose that the user will travel in Japan for the next week, he or she may interact with the route planning device to get a whole trip plan including multiple travel routes before going to Japan. On the other hand, the route planning device may be used when the user is travelling on a vehicle. For example, the user may want to change the route for certain reasons, and thus the route planning device needs to calculate a new navigation route in response to the user's route planning request during the travel. In addition, it should be noted that the vehicle in this context may a traditional vehicle driven by a human driver, a vehicle driven by a robot driver, or an autonomous vehicle without driver control. Accordingly, the user herein may be a human or a robot travelling on either a traditional human driven vehicle or an autonomous vehicle without driver control.

For convenience of description, a route planning process to be used by a user before a trip starts may be referred to as a global offline route planning process hereinafter, while a route planning process to be used by a user when the user is travelling on a vehicle may be referred to as a local online route planning process hereinafter. The global offline route planning process and the local online route planning process will be discussed respectively by referring to FIG. 6A to FIG. 9.

FIG. 6A to FIG. 6G schematically illustrates an exemplary global offline route planning process according to various embodiments of the disclosure.

As shown in FIG. 6A, when the user wants to plan a route from point A to point E, he or she may give out a route planning request by touching on a touch screen in the user interface. For example, the user may first touch the point A on the touch screen and then draw a curve from the point A to the point E, as shown in FIG. 6B. In response to the route planning request, the processor may identify the curve drawn by the user as a line of interest. Then the processor may acquire, via the data interface, road and traffic information associated with the line of interest from the road and traffic data source. The road and traffic information associated with the line of interest may be road and traffic information within a predefined region covering the line of interest on the map. Based on the acquired road and traffic information, a navigation route that best matches the line of interest and meanwhile meets predefined road and traffic constraints may be determined. As shown in FIG. 6C, for example, based on the current road and traffic information, a plausible route A→B→C→E is determined as the navigation route best matching the drawn curve under the predefined road and traffic constraints.

According to various embodiments of the present application, the predefined road and traffic constraints may include following a road layout on the map, avoiding a road segment under repair, avoiding a road segment within which an activity such as a Marathon is going on, avoiding a road segment with bad road conditions, avoiding a road segment having heavy traffic, and the like.

From the point A to the point E, there may be several potential navigation routes meeting the predefined road and traffic constraints, but the route planning device is to determine a certain navigation route best matching the line of interest drawn by the user. Various solutions may be conceived to determine the navigation route best matching the line of interest. For example, the route planning device may first determine several potential navigation routes between the points A and E under the predefined road and traffic constraints, then calculate a fitting degree between each potential navigation route and the line of interest and determine a navigation route having a highest fitting degree as the navigation route best matching the line of interest.

Alternatively, according to the road layout on the map, there may be several intersections associated with the curve from the point A to the point E, so the curve from the point A to the point E may be divided into several sections. For each section, the route planning device may determine the intersections that the navigation route may pass through in order to best fit the section. Finally, when the route planning device determines the intersections associated with each section of the curve from the point A to the point E, a navigation route connecting the determined intersections may be regarded as the navigation route best matching the curve from the point A to the point E.

In some embodiments, the navigation route may be displayed to the user on the touch screen and the user may want to further change the navigation route. For example, as shown in FIG. 6D to FIG. 6F, the user may first long click on the point B, then long click on the point E and drag the route section between the point B and the point E to the point D. In response to the user's actions on the navigation route, the route planning device may automatically calculate a new plausible navigation route under the road and traffic constraints, as shown in FIG. 6G. Otherwise, if the user does not touch the screen within a predetermined time period, the navigation route may be finally determined for navigation.

As explained in the above embodiments, the user can have a real-time interaction with the route planning device via the user interface. During the real-time interaction, the user can further modify the navigation route within the predetermined time period. In addition, for example, the route planning device can not only display the determined navigation route to the user, but also provide information about real-time road or traffic conditions to allow the user to understand how the navigation route is determined and thus improve the user experience. In another example, the user may set a departure time when making the route planning request. In this case, the route planning device may predict future road and traffic conditions at the time the user will really start the travel, and determine another navigation route based on the predicted road and traffic conditions. For example, the future road and traffic conditions may be predicted by performing regression calculations based on historical road and traffic data from the road and traffic data source. As such, both a first navigation route determined based on the current road and traffic conditions and a second navigation route determined based on the predicted road and traffic conditions may be displayed to the user for selection. Actually, the real-time interaction between the user and the route planning device may include various forms of interaction that can make the route planning process more convenient and friendly to the user, which is not limited herein.

Figure 7:
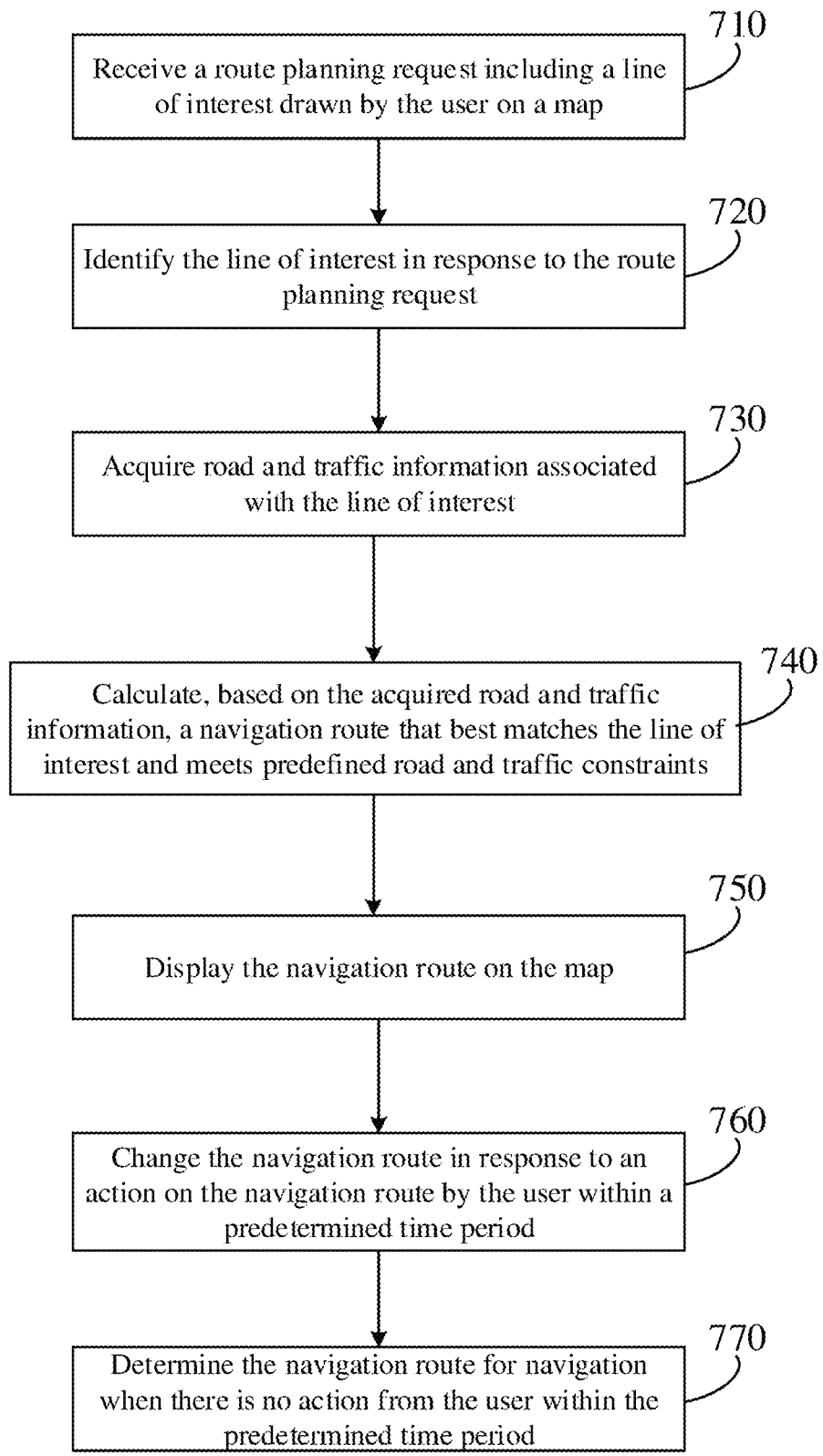
FIG. 7 illustrates a flow chart of an exemplary global offline route planning process according to various embodiments of the disclosure.

FIG. 7 illustrates a flow chart of an exemplary global offline route planning process according to various embodiments of the disclosure.

As shown in FIG. 7, the global offline route planning process may include operations 710 to 770 implemented by the route planning device.

At operation 710, the route planning device may receive a route planning request from a user. The route planning request may include a line of interest drawn by the user on a map.

At operation 720, the route planning device may identify the line of interest in response to the route planning request.

At operation 730, the route planning device may acquire road and traffic information associated with the line of interest from a road and traffic data source.

At operation 740, the route planning device may calculate, based on the acquired road and traffic information, a navigation route that best matches the line of interest and meets predefined road and traffic constraints.

At operation 750, the route planning device may display the navigation route on the map.

At operation 760, the route planning device may change the navigation route in response to an action on the navigation route by the user within a predetermined time period.

At operation 770, the route planning device may determine the navigation route for navigation when there is no action from the user within the predetermined time period.

The details of the above operations have been set forth in the foregoing description about the global offline route planning process in connection with FIG. 6A to FIG. 6G, and will not be repeated here.

As mentioned in the foregoing description, the route planning may not only occur before a trip starts, but also occur when the user is travelling on a vehicle. A route planning process to be used when the user is travelling on the vehicle is referred to as the local online route planning process herein. When the user gets on the vehicle and loads a pre-planned navigation route, the route planning device may re-plan the navigation route according to the current road and traffic conditions. Besides, during the travelling, it is very common that the user may propose a route planning request to change the navigation route. For example, the user may want to add some new sights into the trip or the user may want to find a nearby restaurant to have a lunch. In these situations, the route planning device may implement the so-called local online route planning process to re-plan the navigation route in response to the newly proposed route planning request.

For a running human driven vehicle, the basic principle of the local online route planning process may still be determining a navigation route that best matches a line of interest drawn by a user (usually the driver) and meanwhile meets road and traffic constraints under real-time acquired road and traffic information, which is similar to the global offline route planning process. Then the driver may decide whether to follow the navigation route by considering current driving environment. For example, the driver may decide to follow the navigation route if he or she believes that the navigation route is safe after observing other nearby vehicles. Otherwise, the driver may request the route planning later.

In contrast, for a running autonomous vehicle (AV), sudden route change may cause safety issues. Thus when the route planning device is to be used on the running AV, not only the road and traffic constraints should be met by a navigation route, but also predefined safety driving constraints should be met by the navigation route in order to make sure that the AV will not cause a crash when changing to the navigation route. In other words, the local online route planning process for the running AV should determine the navigation route that best matches the line of interest drawn by the user and meanwhile meets both the road and traffic constraints and the safety driving constraints.

FIG. 8A to 8H schematically illustrate an exemplary local online route planning process according to various embodiments of the disclosure.

As illustrated in FIG. 8A, an AV is running on the middle lane of the map under safety driving constraints defined by a safety driving model. For example, according to the safety driving constraints, the running AV should keep a safety distance from a vehicle ahead. Then a user travelling on the running AV may want to change to the left lane and thus draw a curve on the touch screen, as shown in FIG. 8B. That is, the user has proposed a route planning request (also called "change lane request" in the embodiments) by drawing the curve on the touch screen.

In response to the change lane request, the route planning device may simulate route changing along the curve (i.e. "the line of interest") and determine whether the safety driving constraints are to be violated by the route changing. The route planning device may acquire real-time sensor data via a data interface (e.g. the data interface 132 in FIG. 1) coupled to one or more sensors (e.g. the position sensor and the speed sensor in the sensor unit 130 in FIG. 1) equipped on the running AV. Then the route planning device may determine whether the safety driving constraints are to be violated by the route changing by feeding the acquired real-time sensor data into the safety driving model. In addition to the real-time sensor data, the safety driving model may also involve some parameters inherent to the running AV, such as a maximum or minimum acceleration, a maximum or minimum brake acceleration, a maximum or minimum lateral acceleration, and the like. Therefore, these inherent parameters may be also considered by the route planning device when determining whether the route changing will violate the safety driving constraints.

If the route planning device finds that the safety driving constraints may be violated, the change lane request may be rejected and the running AV may still run on the current navigation route without change. For example, as shown in FIG. 8C, if the running AV changes to the left lane, the distance between the running AV and the vehicle ahead on the left lane will be shorter than the safety distance defined by the safety driving model. In this situation, the safety driving constraints may be violated, thus the route planning device may reject the change lane request from the user and the running AV may still keep on the middle lane, as shown in FIG. 8D.

In some embodiments, the route planning device may inform the user that the change lane request has been rejected, for example, by displaying a prompt message on the touch screen or giving out a voice message. Then the user may make a change lane request again after a certain time period (as shown in FIG. 8F), and the route planning device may perform the determination whether the safety driving constraints may be violated by responding to the change lane request. When it is determined the safety driving constraints will not be violated by the route changing, the route planning device may accept the change lane request and calculate a navigation route under the road and traffic constraints. For example, as shown in FIG. 8G, when the running AV changes to the left lane, the distance between the running AV and the vehicle ahead on the left lane will be equal to or greater than the safety distance defined by the safety driving model. In this situation, the safety driving constraints will not be violated, thus the route planning device may calculate a navigation route that best matches the drawn line and meets the road and traffic constraints and the running AV may change to the left lane following the calculated navigation route, as shown in FIG. 8H.

In some embodiments, in case that the route planning device rejects the route planning request from the user, the route planning device may proactively perform the route planning process again after a predetermined time period, instead of waiting for the user to make a new route planning request.

In some embodiments, the route planning device may also acquire real-time image data via a data interface (e.g. the data interface 134 in FIG. 1) coupled to one or more image capture devices (e.g. the image capture devices 122, 124 and 126 in FIG. 1) equipped on the running AV. According to the acquired real-time image data and sensor data, the route planning device may predict road and traffic conditions around the running AV in a predetermined time period and calculate the navigation route based on the predicted road and traffic conditions.

More particularly, the route planning device may determine whether the safety driving constraints may be violated by considering both the current road and traffic conditions and the predicted road and traffic conditions around the running vehicle. For example, suppose that according to the current road and traffic conditions around the running AV, the safety driving constraints will not be violated by the route changing and thus the route planning device should accept the route planning request and calculate a best matching navigation route. Further, suppose that the route planning device predicts that a nearby vehicle may reduce its speed or change its lane in the next T seconds, and the safety driving constraints will be violated by the route changing under the predicted traffic conditions. In this situation, the route planning device may preferably calculate the navigation route based on the predicted road and traffic conditions in addition to or instead of the current road and traffic conditions.

Figure 9:
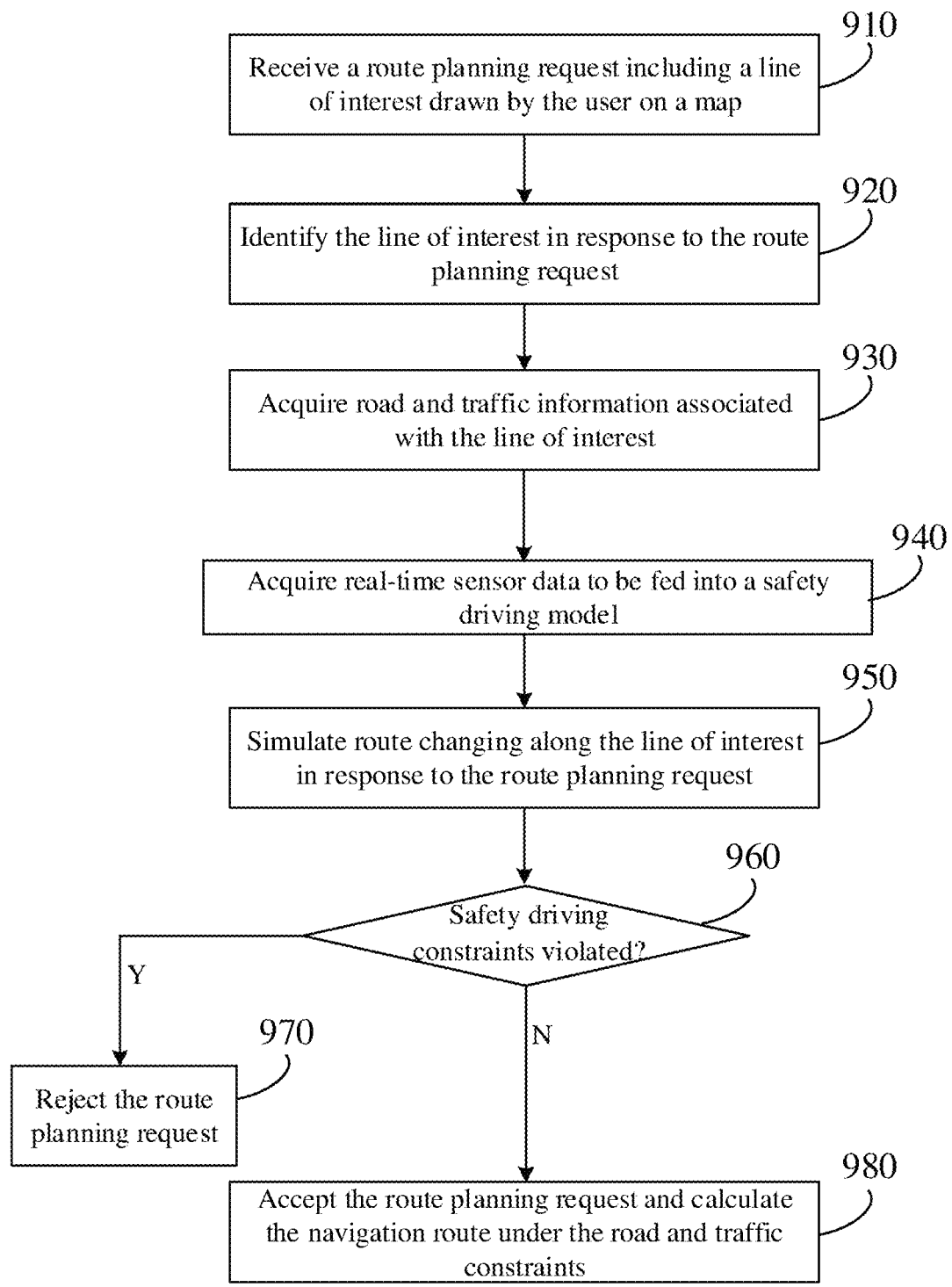
FIG. 9 illustrates a flow chart of an exemplary local online route planning process according to various embodiments of the disclosure.

FIG. 9 illustrates a flow chart of an exemplary local online route planning process according to various embodiments of the disclosure.

As shown in FIG. 9, the local online route planning process may include operations 910 to 980 implemented by the route planning device.

At operation 910, the route planning device may receive a route planning request from a user. The route planning request may include a line of interest drawn by a user on a map. The user is travelling on a running AV.

At operation 920, the route planning device may identify the line of interest in response to the route planning request.

At operation 930, the route planning device may acquire road and traffic information associated with the line of interest from a road and traffic data source.

At operation 940, the route planning device may acquire, from one or more sensors on the running AV, real-time sensor data to be fed into the safety driving model.

At operation 950, the route planning device may simulate route changing along the line of interest in response to the route planning request.

At operation 960, the route planning device may determine whether the safety driving constraints are to be violated by the route changing.

At operation 970, the route planning device may reject the route planning request when it is determined the safety driving constraints are to be violated by the route changing.

At operation 980, the route planning device may accept the route planning request and calculate the navigation route under the road and traffic constraints when it is determined the safety driving constraints are not to be violated by the route changing.

The details of the above operations have been set forth in the foregoing description about the local online route planning process in connection with FIG. 8A to FIG. 8G, and will not be repeated here.

The following paragraphs describe examples of various embodiments.

Example 1 includes a route planning device, comprising a data interface coupled to a road and traffic data source; a user interface configured to display a map and receive a route planning request from a user, the route planning request comprising a line of interest on the map; a processor coupled to the data interface and the user interface, and configured to: identify the line of interest in response to the route planning request; acquire, via the data interface, road and traffic information associated with the line of interest from the road and traffic data source; and calculate, based on the acquired road and traffic information, a navigation route that matches or corresponds to the line of interest and meets or satisfies predefined road and traffic constraints.

Example 2 includes the route planning device of example 1, wherein: the user interface is further configured to display the navigation route on the map; and the processor is further configured to change the navigation route in response to an update request on planning the navigation route within a predetermined time period, and determine the navigation route for navigation when there is no update request within the predetermined time period.

Example 3 includes the route planning device of example 2, wherein the update request is based on a user action on the user interface.

Example 4 includes the route planning device of example 3, wherein the user action comprises a long click on a point on the navigation route and dragging a portion of the navigation route.

Example 5 includes the route planning device of any of examples 1 to 4, wherein the road and traffic information in the road and traffic source is to be updated periodically or in real time, and the processor is further configured to acquire the updated road and traffic information periodically or in real time, and calculate the navigation route based on the updated road and traffic information.

Example 6 includes the route planning device of example 1, wherein the route planning request further comprises a departure time preset by the user; and the processor is further configured to predict road and traffic conditions at the departure time based on historical road and traffic information from the road and traffic data source, and calculate the navigation route based on the predicted road and traffic conditions.

Example 7 includes the route planning device of example 1, wherein: the route planning device is in a running autonomous vehicle (AV); the data interface is a first data interface, and the route planning device further comprises a second data interface coupled to one or more sensors on the running AV; and the processor is further configured to acquire, via the second data interface, real-time sensor data to be fed into a safety driving model, and calculate the navigation route that matches or corresponds to the line of interest and meets or satisfies both the road and traffic constraints and predefined safety driving constraints.

Example 8 includes the route planning device of example 7, wherein the processor is further configured to: simulate route changing along the line of interest in response to the route planning request; determine whether the route changing violates the safety driving constraints; reject the route planning request when it is determined the route changing violates the safety driving constraints; and accept the route planning request and calculate the navigation route under the road and traffic constraints when it is determined the route changing does not violate the safety driving constraints.

Example 9 includes the route planning device of example 8, wherein the processor is further configured to: predict road and traffic conditions around the running AV in a predetermined time period; and calculate the navigation route based on the predicted road and traffic conditions.

Example 10 includes the route planning device of any of examples 1 to 9, the predefined road and traffic constraints comprises following a road layout on the map, avoiding a road segment under repair, avoiding a road segment within which an activity is going on, avoiding a road segment with bad road conditions and avoiding a road segment having heavy traffic.

Example 11 includes an autonomous vehicle, comprising a control system, one or more image capture devices, one or more sensors, and the route planning device of any of examples 1 to 10, wherein the navigation route planned by the route planning device is provided to the control system in response to the route planning request.

Example 12 includes a route planning method, comprising: receiving a route planning request from a user, the route planning request comprising a line of interest on a map; identifying the line of interest in response to the route planning request; acquiring road and traffic information associated with the line of interest from a road and traffic data source; and calculating, based on the acquired road and traffic information, a navigation route that matches or corresponds to the line of interest and meets or satisfies predefined road and traffic constraints.

Example 13 includes the route planning method of example 12, further comprising: displaying the navigation route on the map; changing the navigation route in response to an update request on planning the navigation route within a predetermined time period; and determining the navigation route for navigation when there is no update request within the predetermined time period.

Example 14 includes the route planning method of example 13, wherein the update request is based on a user action on the user interface.

Example 15 includes the route planning method of example 14, wherein the user action comprises a long click on a point on the navigation route and dragging a portion of the navigation route.

Example 16 includes the route planning method of any of examples 12 to 15, wherein the road and traffic information in the road and traffic source is to be updated periodically or in real time, and the method further comprises acquiring the updated road and traffic information periodically or in real time and calculating the navigation route based on the updated road and traffic information.

Example 17 includes the route planning method of example 12, wherein the route planning request further comprises a departure time preset by the user; and the method further comprises predicting road and traffic conditions at the departure time based on historical road and traffic information from the road and traffic data source, and calculating the navigation route based on the predicted road and traffic conditions.

Example 18 includes the route planning method of example 12, wherein the route planning method is performed in a running autonomous vehicle (AV) and further comprises: acquiring, from one or more sensors on the running AV, real-time sensor data to be fed into a safety driving model; and calculating the navigation route that matches or corresponds to the line of interest and meets or satisfies both the road and traffic constraints and predefined safety driving constraints.

Example 19 includes the route planning method of example 18, further comprising: simulating route changing along the line of interest in response to the route planning request; determining whether the route changing violates the safety driving constraints; rejecting the route planning request when it is determined the route changing violates the safety driving constraints; and accepting the route planning request and calculating the navigation route under the road and traffic constraints when it is determined the route changing does not violate the safety driving constraints.

Example 20 includes the route planning method of example 19, further comprising: predicting road and traffic conditions around the running AV in a predetermined time period; and calculating the navigation route based on the predicted road and traffic conditions.

Example 21 includes the route planning method of any of examples 12 to 20, the predefined road and traffic constraints comprises following a road layout on the map, avoiding a road segment under repair, avoiding a road segment within which an activity is going on, avoiding a road segment with bad road conditions and avoiding a road segment having heavy traffic.

Example 22 includes a computer-readable medium having instructions stored thereon, the instructions, when executed by a processor, to cause the processor to perform the route planning method of any of examples 12 to 21.

Example 23 includes a route planning apparatus, comprising: means for receiving a route planning request from a user, the route planning request comprising a line of interest on a map; means for identifying the line of interest in response to the route planning request; means for acquiring road and traffic information associated with the line of interest from a road and traffic data source; and means for calculating, based on the acquired road and traffic information, a navigation route that matches or corresponds to the line of interest and meets or satisfies predefined road and traffic constraints.

Example 24 includes the route planning apparatus of example 23, further comprising: means for displaying the navigation route on the map; means for changing the navigation route in response to an update request on planning the navigation route within a predetermined time period; and means for determining the navigation route for navigation when there is no update request within the predetermined time period.

Example 25 includes the route planning apparatus of example 24, wherein the update request is based on a user action on the user interface.

Example 26 includes the route planning apparatus of example 25, wherein the user action comprises a long click on a point on the navigation route and dragging a portion of the navigation route.

Example 27 includes the route planning apparatus of any of examples 23 to 26, wherein the road and traffic information in the road and traffic source is to be updated periodically or in real time, and the apparatus further comprises means for acquiring the updated road and traffic information periodically or in real time and means for calculating the navigation route based on the updated road and traffic information.

Example 28 includes the route planning apparatus of example 23, wherein the route planning request further comprises a departure time preset by the user; and the apparatus further comprises means for predicting road and traffic conditions at the departure time based on historical road and traffic information from the road and traffic data source, and means for calculating the navigation route based on the predicted road and traffic conditions.

Example 29 includes the route planning apparatus of example 23, wherein the route planning apparatus is in a running autonomous vehicle (AV) and further comprises: means for acquiring, from one or more sensors on the running AV, real-time sensor data to be fed into a safety driving model; and means for calculating the navigation route that matches or corresponds to the line of interest and meets or satisfies both the road and traffic constraints and predefined safety driving constraints.

Example 30 includes the route planning apparatus of example 29, further comprising: means for simulating route changing along the line of interest in response to the route planning request; means for determining whether the route changing violates the safety driving constraints; means for rejecting the route planning request when it is determined the route changing violates the safety driving constraints; and means for accepting the route planning request and calculating the navigation route under the road and traffic constraints when it is determined the route changing does not violate the safety driving constraints.

Example 31 includes the route planning apparatus of example 30, further comprising: means for predicting road and traffic conditions around the running AV in a predetermined time period; and means for calculating the navigation route based on the predicted road and traffic conditions.

Example 32 includes the route planning apparatus of any of examples 23 to 31, the predefined road and traffic constraints comprises following a road layout on the map, avoiding a road segment under repair, avoiding a road segment within which an activity is going on, avoiding a road segment with bad road conditions and avoiding a road segment having heavy traffic.

Example 33 includes a route planning processor configured to perform the route planning method of any of examples 12 to 21.

Example 34 includes a user interface for navigation. The user interface is configured to display a map, receive a route planning request from a user and display a navigation route on the map in response to the route planning request, wherein the route planning request comprises a line of interest on the map, and the navigation route matches or corresponds to the line of interest and meets or satisfies predefined road and traffic constraints.

Example 35 includes the user interface of example 34, wherein the user interface is further configured to receive an update request on planning the navigation route within a predetermined time period, and the navigation route is changed in response to the update request.

Example 36 includes the user interface of example 34, wherein the user interface is incorporated in a running autonomous vehicle (AV) and the navigation route further meets or satisfies predefined safety driving constraints.

Example 37 includes the user interface of example 36, further configured to: reject the route planning request when a simulated route changing along the line of interest violates the safety driving constraints; and accept the route planning request and display the navigation route when the simulated route changing does not violate the safety driving constraints.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. A route planning device, comprising:
a data interface coupled to a road and traffic data source;
a user interface configured to display a map and receive a route planning request from a user, the route planning request comprising a line of interest on the map;
a processor coupled to the data interface and the user interface, and configured to:
identify the line of interest in response to the route planning request;
acquire, via the data interface, road and traffic information associated with the line of interest from the road and traffic data source; and
calculate, based on the acquired road and traffic information, a navigation route that matches or corresponds to the line of interest and meets or satisfies predefined road and traffic constraints;
wherein the route planning device is in a running autonomous vehicle (AV);

the data interface is a first data interface, and the route planning device further comprises a second data interface coupled to one or more sensors on the running AV; and the processor is further configured to:

acquire, via the second data interface, real-time sensor data to be fed into a safety driving model, calculate the navigation route that matches or corresponds to the line of interest and meets or satisfies both the road and traffic constraints and predefined safety driving constraints;

simulate route changing along the line of interest in response to the route planning request;

determine whether the route changing violates the safety driving constraints;

reject the route planning request when it is determined the route changing violates the safety driving constraints; and accept the route planning request and calculate the navigation route under the road and traffic constraints when it is determined the route changing does not violate the safety driving constraints.

2. The route planning device of claim 1, wherein:

the user interface is further configured to display the navigation route on the map; and the processor is further configured to change the navigation route in response to an update request on planning the navigation route within a predetermined time period, and determine the navigation route for navigation when there is no updated request within the predetermined time period.

3. The route planning device of claim 2, wherein the update request is based on a user action on the user interface.

4. The route planning device of claim 3, wherein the user action comprises a long click on a point on the navigation route and dragging a portion of the navigation route.

5. The route planning device of claim 1, wherein the road and traffic information in the road and traffic source is to be updated periodically or in real time, and the processor is further configured to acquire the updated road and traffic information periodically or in real time, and calculate the navigation route based on the updated road and traffic information.

6. The route planning device of claim 1, wherein the route planning request further comprises a departure time preset by the user; and the processor is further configured to predict road and traffic conditions at the departure time based on historical road and traffic information from the road and traffic data source, and calculate the navigation route based on the predicted road and traffic conditions.

7. The route planning device of claim 1, wherein the processor is further configured to:

predict road and traffic conditions around the running AV in a predetermined time period; and calculate the navigation route based on the predicted road and traffic conditions.

8. The route planning device of claim 1, wherein the predefined road and traffic constraints comprise following a road layout on the map, avoiding a road segment under repair, avoiding a road segment within which an activity is going on, avoiding a road segment with bad road conditions and avoiding a road segment having heavy traffic.

9. An autonomous vehicle, comprising a control system, one or more image capture devices, one or more sensors, and a route planning device comprising:

a data interface coupled to a road and traffic data source;

a user interface configured to display a map and receive a route planning request from a user, the route planning request comprising a line of interest on the map;

a processor coupled to the data interface and the user interface, and configured to:

identify the line of interest in response to the route planning request;

acquire, via the data interface, road and traffic information associated with the line of interest from the road and traffic data source; and calculate, based on the acquired road and traffic information, a navigation route that matches or corresponds to the line of interest and meets or satisfies predefined road and traffic constraints;

wherein the navigation route planned by the route planning device is provided to the control system in response to the route planning request;

wherein the data interface is a first data interface, and the autonomous vehicle further comprises a second data interface coupled to one or more sensors on the autonomous vehicle; and wherein the processor is further configured to:

acquire, via the second data interface, real-time sensor data to be fed into a safety driving model, calculate the navigation route that matches or corresponds to the line of interest and meets or satisfies both the road and traffic constraints and predefined safety driving constraints;

simulate route changing along the line of interest in response to the route planning request;

determine whether the route changing violates the safety driving constraints;

reject the route planning request when it is determined the route changing violates the safety driving constraints; and accept the route planning request and calculate the navigation route under the road and traffic constraints when it is determined the route changing does not violate the safety driving constraints.

10. A route planning method, comprising:

receiving a route planning request from a user, the route planning request comprising a line of interest on a map;

identifying the line of interest in response to the route planning request;

acquiring road and traffic information associated with the line of interest from a road and traffic data source; and calculating, based on the acquired road and traffic information, a navigation route that matches or corresponds to the line of interest and meets or satisfies predefined road and traffic constraints;

wherein the route planning method is performed in a running autonomous vehicle (AV) and further comprises:

acquiring, from one or more sensors on the running AV, real-time sensor data to be fed into a safety driving model;

calculating the navigation route that matches or corresponds to the line of interest and meets or satisfies both the road and traffic constraints and predefined safety driving constraints;

simulating route changing along the line of interest in response to the route planning request;

determining whether the route changing violates the safety driving constraints;

rejecting the route planning request when it is determined the route changing violates the safety driving constraints; and accepting the route planning request and calculating the navigation route under the road and traffic constraints when it is determined the route changing does not violate the safety driving constraints.

11. The route planning method of claim 10, further comprising:

displaying the navigation route on the map;

changing the navigation route in response to an update request on planning the navigation route within a predetermined time period; and determining the navigation route for navigation when there is no update request within the predetermined time period.

12. The route planning method of claim 11, wherein the update request is based on a user action on the user interface.

13. The route planning method of claim 12, wherein the user action comprises a long click on a point on the navigation route and dragging a portion of the navigation route.

14. The route planning method of claim 10, wherein the road and traffic information in the road and traffic source is to be updated periodically or in real time, and the method further comprises acquiring the updated road and traffic information periodically or in real time and calculating the navigation route based on the updated road and traffic information.

15. The route planning method of claim 10, wherein the route planning request further comprises a departure time preset by the user; and the method further comprises predicting road and traffic conditions at the departure time based on historical road and traffic information from the road and traffic data source, and calculating the navigation route based on the predicted road and traffic conditions.

16. The route planning method of claim 10, further comprising:

predicting road and traffic conditions around the running AV in a predetermined time period; and calculating the navigation route based on the predicted road and traffic conditions.

17. A non-transitory computer-readable medium having instructions stored thereon, wherein the instructions, when executed by a processor, cause the processor to:

receive a route planning request from a user, the route planning request comprising a line of interest on a map;

identify the line of interest in response to the route planning request;

acquire road and traffic information associated with the line of interest from a road and traffic data source; and calculate, based on the acquired road and traffic information, a navigation route that matches or corresponds to the line of interest and meets or satisfies predefined road and traffic constraints;

acquire, from one or more sensors on a running autonomous vehicle (AV), real-time sensor data to be fed into a safety driving model;

calculate the navigation route that matches or corresponds to the line of interest and meets or satisfies both the road and traffic constraints and predefined safety driving constraints;

simulate route changing along the line of interest in response to the route planning request;

determine whether the route changing violates the safety driving constraints;

rejecting the route planning request when it is determined the route changing violates the safety driving constraints; and accept the route planning request and calculating the navigation route under the road and traffic constraints when it is determined the route changing does not violate the safety driving constraints.

* * * * *